(12) United States Patent
Tabasso et al.

(10) Patent No.: US 8,294,666 B2
(45) Date of Patent: Oct. 23, 2012

(54) LAPDESK WITH RETRACTABLE TOUCHPAD

(75) Inventors: Alain Tabasso, Essertines (CH);
Guillaume Bourelly, Lausanne (CH);
Alexis Richard, La Tour-de-Peilz (CH)

(73) Assignee: Logitech Europe S.A., Romanel-sur-Morges (CH)

( * ) Notice: Subject to any disclaimer, the term of this patent is extended or adjusted under 35 U.S.C. 154(b) by 203 days.

(21) Appl. No.: 12/695,014

(22) Filed: Jan. 27, 2010

(65) Prior Publication Data
US 2011/0163953 A1 Jul. 7, 2011

Related U.S. Application Data

(63) Continuation-in-part of application No. 12/651,870, filed on Jan. 4, 2010, now abandoned.

(51) Int. Cl.
*G09G 5/00* (2006.01)
(52) U.S. Cl. .................... 345/156; 361/679.55
(58) Field of Classification Search .......... 345/157, 345/158, 163, 173, 156; 361/679.52–679.56; 165/80.2, 104.17; D14/447
See application file for complete search history.

(56) References Cited

U.S. PATENT DOCUMENTS

| 6,012,788 | A   | * | 1/2000  | Marschand et al. ...... 312/223.3 |
| 8,087,632 | B2  | * | 1/2012  | Liu ............................ 248/371 |
| 2004/0090417 | A1 | * | 5/2004  | Amiri ........................ 345/156 |
| 2004/0264851 | A1 | * | 12/2004 | Amiri ........................ 385/31 |
| 2011/0038121 | A1 | * | 2/2011  | Tabasso et al. .......... 361/679.51 |
| 2011/0164376 | A1 |   | 7/2011  | Tabasso et al. |

OTHER PUBLICATIONS

Non-Final Office Action for U.S. Appl. No. 12/651,870 mailed on Oct. 3, 2011, 4 pages.

* cited by examiner

*Primary Examiner* — Ricardo L Osorio
(74) *Attorney, Agent, or Firm* — Kilpatrick Townsend & Stockton LLP

(57) ABSTRACT

A lapdesk for use with a laptop computer includes a housing having a top configured to support the laptop computer. The housing is configured to block heat emitted from the laptop computer from passing through the housing. The lapdesk further includes a tray having a touchpad disposed thereon. The tray is configured to slide into the housing and slide out from the housing. The lapdesk further includes a circuit coupled to the touchpad where the circuit is configured to transmit control signals from the touchpad to the laptop computer.

19 Claims, 5 Drawing Sheets

LAPDESK WITH RETRACTABLE TOUCHPAD

CROSS REFERENCE TO RELATED APPLICATIONS

The present application claims priority to U.S. patent application Ser. No. 12/651,870 as a Continuation in Part Application, filed Jan. 4, 2010, of Alain Tabasso, et al., titled LAPDESK WITH RETRACTABLE TOUCHPAD," which is incorporated by reference herein in its entirety for all purposes.

BACKGROUND OF THE INVENTION

The present invention is directed to a lapdesk for a laptop computer. More specifically, the present invention is directed to a lapdesk with a retractable tray with multi-touch functionality.

Laptop computers now account for almost half of all computer sales. Laptop computers, as of recent, also have the same computing power and functionality of desktop computers, and provide computing power wherever desired. Further, with the increasing popularity of laptop computers having touchpads, and smart phones and MP3 players with touchpads, users have been exposed to a new level of touch experience. With this increased exposure to touchpads, users expect more of the touch experience and touch functions associated with touchpads.

Therefore, manufactures of peripheral devices, which are configured for use with laptop computers, have a large impetus to create new peripheral devices that provide the touch experience. Specifically, a current need has arisen for a lapdesk with a touchpad to provide the added touch functions that users demand.

BRIEF SUMMARY OF THE INVENTION

The present invention is directed to a lapdesk for a laptop computer. More specifically, the present invention is directed to a lapdesk with a retractable tray with multi-touch functionality.

According to one embodiment of the present invention, a lapdesk for use with a laptop computer includes a housing having a top configured to support the laptop computer. The housing is configured to block heat emitted from the laptop computer from passing through the housing. The lapdesk further includes a tray having a touchpad disposed thereon. The tray is configured to slide into the housing and slide out from the housing. The lapdesk further includes a circuit coupled to the touchpad where the circuit is configured to transmit control signals from the touchpad to the laptop computer.

According to a specific embodiment, the touchpad includes a set of control buttons. The set of control buttons may include a power switch configured to change a power state of the laptop computer. The power state is a sleep state, an on state, or a power off state. Alternatively, the set of control buttons includes a set of volume control buttons. Alternatively, the set of control buttons includes a set of media control buttons. Alternatively, the set of control buttons includes a send button configured to initiate the sending of an electronic communication by the laptop computer. The send button is configured to operate with the circuit to send image information in the electronic communication for an image drawn on the touchpad. The electronic communication may be an e-mail. According to one embodiment, the function of the controls buttons changes based on the particular application that is operating the laptop computer. For example, the control buttons may be configured to perform different functions for a media player operating on the laptop computers as compared to a communication application or a photo editor application operating on the laptop computer.

According to another specific embodiment, the tray includes a set of backlights disposed under the set of control buttons, wherein the set of backlights is configured to backlight the set of control buttons. The set of backlights may be configured to be turned on and off by an application running on the laptop computer.

According to another specific embodiment, the touchpad is a resistive touchpad. The tray and touchpad may be detachable from the housing.

According to another specific embodiment, the circuit includes a transmitter, which is configured to wirelessly communicate with the laptop computer. Alternatively, the circuit is coupled to a wired connector, which is configured to couple to the laptop computer for transferring control signal between the circuit and the laptop computer.

According to one embodiment, a lapdesk for use with a laptop computer includes a housing having a top configured to support the laptop computer. The housing is configured to block heat emitted from the laptop computer from passing through the housing. The lapdesk further includes a tray having a touchpad disposed thereon. The tray is configured to slide into the housing and slide out from the housing. The lapdesk further includes a circuit coupled to the touchpad where the circuit is configured to transmit control signals from the touchpad to the laptop computer. The lapdesk further includes a paper detector coupled to the tray and to the circuit. The paper detector is configured to detect a piece of paper placed on the tray and operates with the circuit to send a control signal to the laptop computer to perform a drawing operation. The drawing operation may include starting a draw program on the laptop computer, or launching a blank pallet on a draw program. The paper detector may be configured to detect the removal of a piece of paper from the touchpad. If the piece of paper is removed from the touchpad, the paper detector is configured to operate with the circuit to send a control signal to the laptop computer to save a drawing drawn on the paper where the drawings is detected by the touchpad.

A better understanding of the nature and advantages of the present invention may be gained with reference to the following detailed description and the accompanying drawings.

DETAILED DESCRIPTION OF SELECT EMBODIMENTS THE INVENTION

The present invention provides a lapdesk for a laptop computer. More specifically, the present invention provides a lapdesk with a touchpad for a laptop computer where the touchpad is configured to provide a variety of functions for the laptop computer.

Figure 1A:
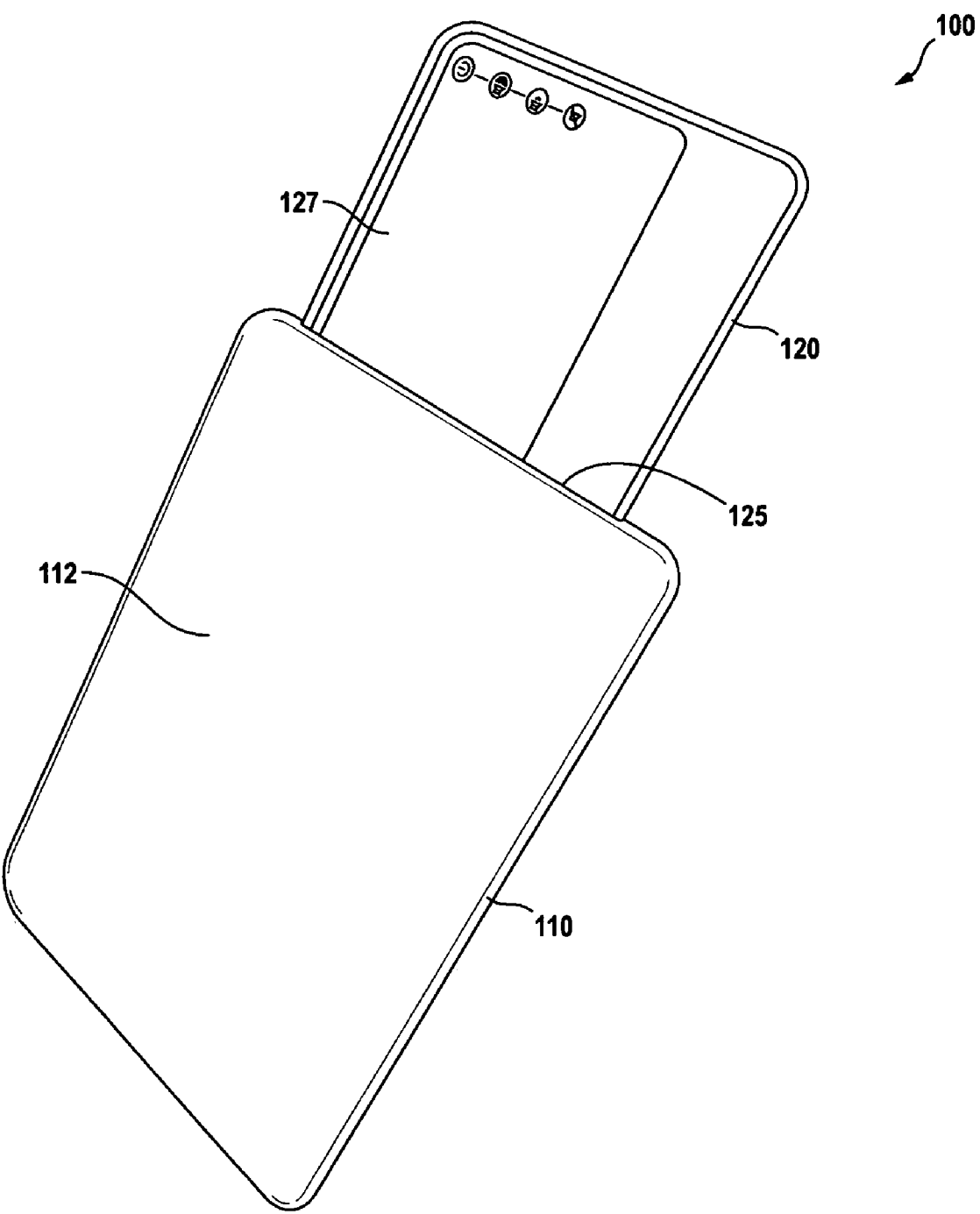
FIG. 1A is a simplified schematic of a lapdesk according to one embodiment of the present invention.

FIG. 1A is a simplified schematic of a lapdesk 100 according to one embodiment of the present invention. Lapdesk 100 includes a housing 110 and a tray 120. Housing 110 has a top 112, which may be relatively flat. According to other embodiment, the top might not be flat, and might have a shape with a set of trenches or a concave profile that allows air to circulate underneath the laptop computer. Top 112 is configured to support a laptop computer. Housing 110 also includes a bottom (not shown), which is configured to be placed on a user's lap or the like for use. The bottom of housing 110 may be formed of a heating insulating material, such as plastic. The lapdesk is configured to operate as a heat barrier between a laptop computer placed on top 112 and a user's lap in contact with the bottom of the lapdesk.

According to one embodiment, housing 110 includes a set of electrical connectors 155 (see FIG. 1B, which is described below in detail), which are configured to connect the lapdesk to a laptop computer. The set of electrical connectors may include a wire connector that is configured for Universal Serial Bus (USB) communications, Firewire communications, or the like. Housing 110 may also include a wireless transceiver 160 (see FIG. 1B), which is configured to wirelessly communicate with a laptop computer. The wireless transceiver may be configured to communicate via a variety of wireless communication protocols such as a Bluetooth format, a Home RF format, or the like.

According to one embodiment, tray 120 is configured to be pulled out from, and inserted into, a slot 125 in housing 110. The housing protects the tray when the tray is not in use and is in the fully inserted position. According to a specific embodiment, tray 120 may be configured to be removed from housing 110, and may be fully detachable from the housing. The housing and/or the tray may include various latching mechanisms for holding the tray in the housing with the tray in a fully retracted position. The housing and/or tray may also include various coupling mechanisms to hold the tray at a relatively fixed position if the tray is partially pulled out from the housing as shown in FIG. 1A. The tray may be configured for placing a mouse or the like thereon for use with a laptop computer, which is used with the lapdesk.

According to one embodiment, tray 120 includes a touchpad 127. Touchpad 127 is configured for use as a human interface device (HID) with a laptop computer, which is in communication with the lapdesk. According to an alternative embodiment, touchpad 127 is integrated on the top of the lapdesk.

Figure 1B:
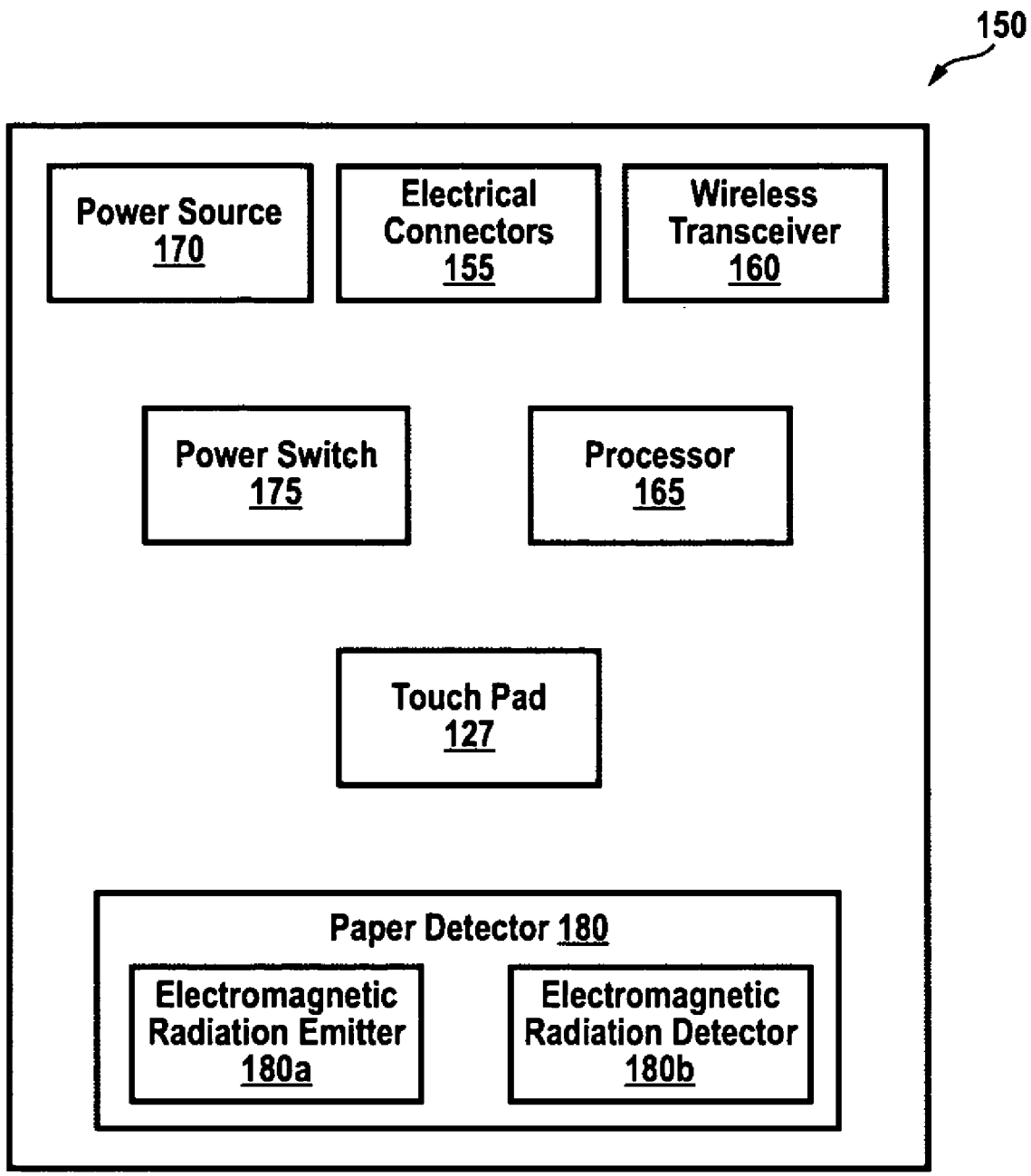
FIG. 1B is a simplified circuit diagram of a circuit that may be included in the lapdesk.

FIG. 1B is a simplified circuit diagram of a circuit 150 that may be included in lapdesk 100. Circuit 150 may be in housing 110 or may be in tray 120. Circuit 150 may include the set of electrical connectors 155, wireless transceiver 160, a processor 165, a power source 170 (battery, rechargeable battery, etc.), a power switch 175, and touchpad 127. The set of electrical connectors 155, wireless transceiver 160, processor 165 (e.g., a microprocessor), power source 170, and touchpad 127 may each be communicatively coupled to the processor. In some embodiments, if the lapdesk includes a wireless transceiver, the lapdesk might not include the set of electrical connectors. Similarly, if the lapdesk includes the set of electrical connectors, the lapdesk might not include the wireless transceiver. According to an alternative embodiment, circuit 150 does not include the power source, and is configured to draw power from a laptop computer via the set of electrical connectors. Processor 165 is configured to control communication between the touchpad and a laptop computer in communication with the touchpad. Specifically, processor 165 may collect signals from the touchpad, formulate the collected signals into control signals, and control the transmission of the control signals to the laptop computer.

According to one embodiment, power switch 175 is configured to power on the lapdesk by supplying power from power source 170 to circuit 150. Power switch 175 is a user operable switch and may be disposed on the bottom of the lapdesk. Alternatively, power switch 175 is configured to detect that the tray is pulled from the housing and power on circuit 150. The power switch 175 may also be configured to detect that the tray is pushed fully back into the housing to power off circuit 150. According to an embodiment in which the lapdesk does not include power source 170, circuit 150 might not include power switch 175. The circuit 150 may be powered on by connecting the set of electrical connectors to the laptop computer, and may be powered off by disconnecting the set of electrical connectors from the laptop computer. According to another embodiment, the power source 170 may include rechargeable batteries that may be charged by connecting the set of electrical connectors to the laptop computer.

Figure 2:
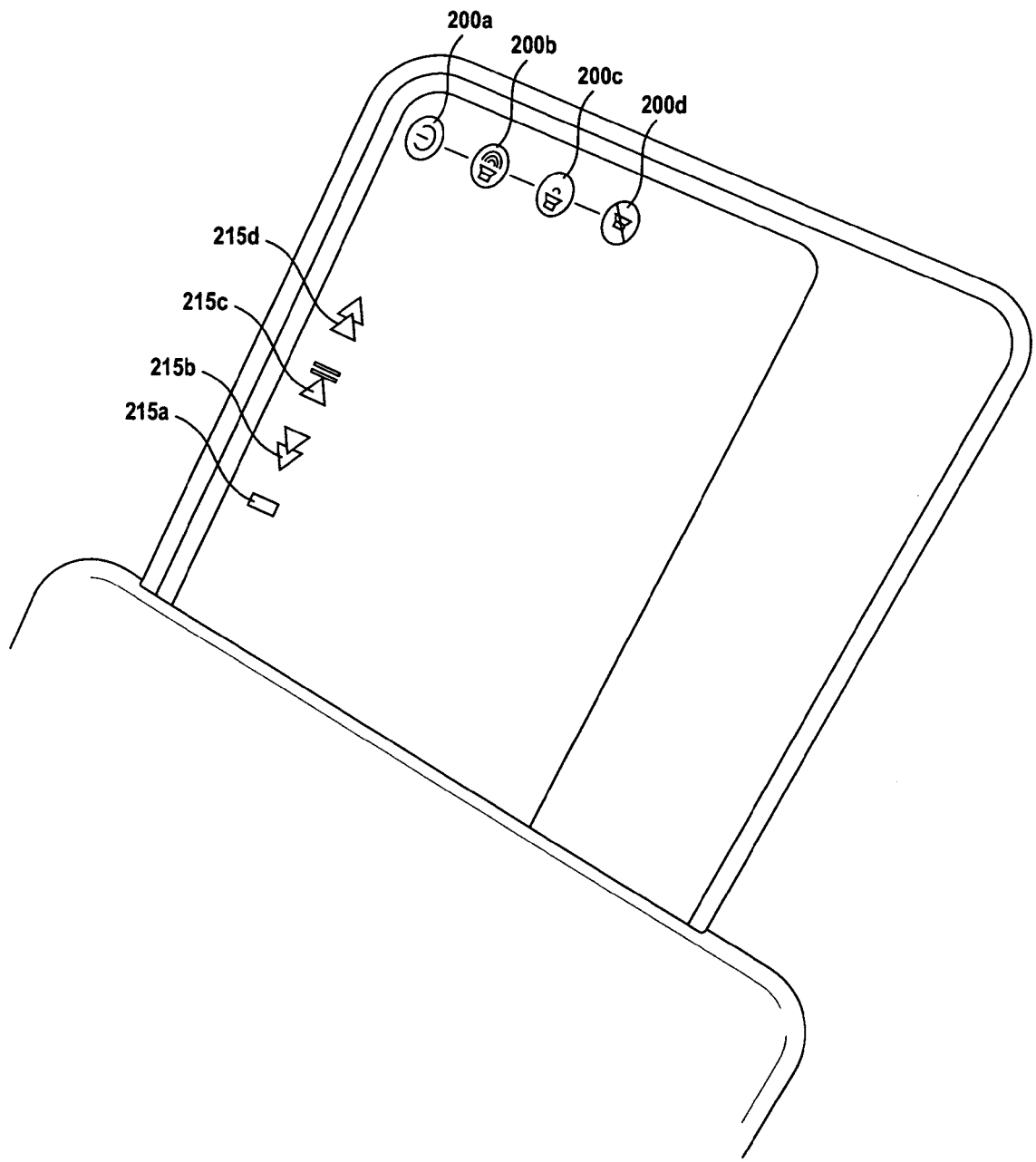
FIG. 2 is a simplified schematic of the lapdesk according to one embodiment of the present.

FIG. 2 is a simplified schematic of lapdesk 100 according to one embodiment of the present invention and shows tray 120 in further detail. According to one embodiment, tray 120 includes a set of control buttons 200. The set of control buttons may be integrally formed with touchpad 127 and may be independent of the touchpad. For example, the set of control buttons may be "touch" buttons or may be "click" buttons. A touch button may be touched with little or no pressure to activate the touch button. A click button may be pressed on with a threshold force to activate (or click) the click button.

The set of control buttons may include a power button 200a. Power button 200a may be configured to power down or power up a laptop computer, or put a laptop computer in a "sleep" mode. A sleep mode, as is well known in the art, is a low power consumptions mode, which has a relatively fast "wake" time.

The set of control buttons 200 may also include various volume control buttons 200b, 200c, and 200d, which are configured to control the volume output from a set of speakers of a laptop computer. Volume control button 200b may be configured to raise the volume of the speakers. Volume control button 200c may be configured to lower the volume of the speakers. Volume control button 200d may be configured to mute the volume of the speakers. The set of control buttons may be configured to be backlighted by a set of backlights (e.g., LEDs) 205 (see FIG. 1B) disposed under the touchpad. Lapdesk 100 may include an independent switch 210 that is configured to turn on and off the set of backlights. The switch may be a user controlled switch or may be a light activated switch, which may be configured to turn the backlights on and off dependent on the ambient light where the lapdesk is used. Alternatively, the set of backlights may be configured to be turned on and off via a program operating on the laptop computer.

According to one embodiment, touchpad 127 includes a set of media control buttons 215. The media control buttons may be touch buttons or click buttons. The set of media control buttons may be backlighted. The set of media control buttons might be printed on the touchpad such that the set of media control buttons are substantially not visible, unless the backlight for the set of media control buttons is turned on. For example, the set of media control buttons may be printed on a bottom surface, or intermediate layer of the touchpad so that the media control buttons are generally not visible unless backlighted. Such buttons are sometimes referred to as dead front buttons. A backlight for the set of media control buttons may be turned on via a switch in circuit 150, or may be turned on based on a particular application that is operating on the laptop computer. For example, if a media program (e.g., music player, video player, etc.) is operating on the computer, the computer may be configured to send a control signal to the processor to turn on the backlight for the set of media control buttons. According to a specific embodiment, the set of media control buttons is not activated unless the backlight for these buttons is turned on. The set of media control buttons may include a stop button 215*a*, a reverse button 215*b*, a play/pause button 215*c*, and a fast forward button 215*d*. The set of media control buttons may be configured to control a media program (e.g., Windows MediaPlayer™, a picture viewer, etc.) and/or media hardware (e.g., a CD player) operating on the laptop computer.

According to one embodiment of the invention, the touchpad is a resistive touchpad. Touchpad 120 may be configured as a human input device having the capabilities of conventional computer mouse, trackball, etc. For example, the touchpad may be configured to control movement of a pointer or other graphical object displayed on the laptop computer's monitor as a user drags a finger, a stylus, a pen, etc. across the touchpad. The touchpad may be configured to be tapped to select a graphical object, such as selecting a graphical object for dragging or selecting a screen button for activation. The touchpad may be configured to be double tapped to perform other functions. Depending on the particular application operating on the laptop computer, the touchpad may be configured to control scrolling, panning, zooming, and rotating images on the laptop computer's display. For example, if a menu is displayed on the laptop computer's display, moving a finger left or right on the touchpad may cause the touchpad to control left or right navigation through the menu. Up or down movement of a finger on the touchpad may cause the touchpad to control up or down navigation through the menu. Those of skill in the art will recognize other functions that the touchpad may perform in combination with other programs operating on a laptop computer. According to one embodiment, the function of the controls buttons changes based on the particular application that is operating the laptop computer. For example, the control buttons may be configured to perform different functions for a media player operating on the laptop computers as compared to a communication application or a photo editor application operating on the laptop computer.

Figure 3:
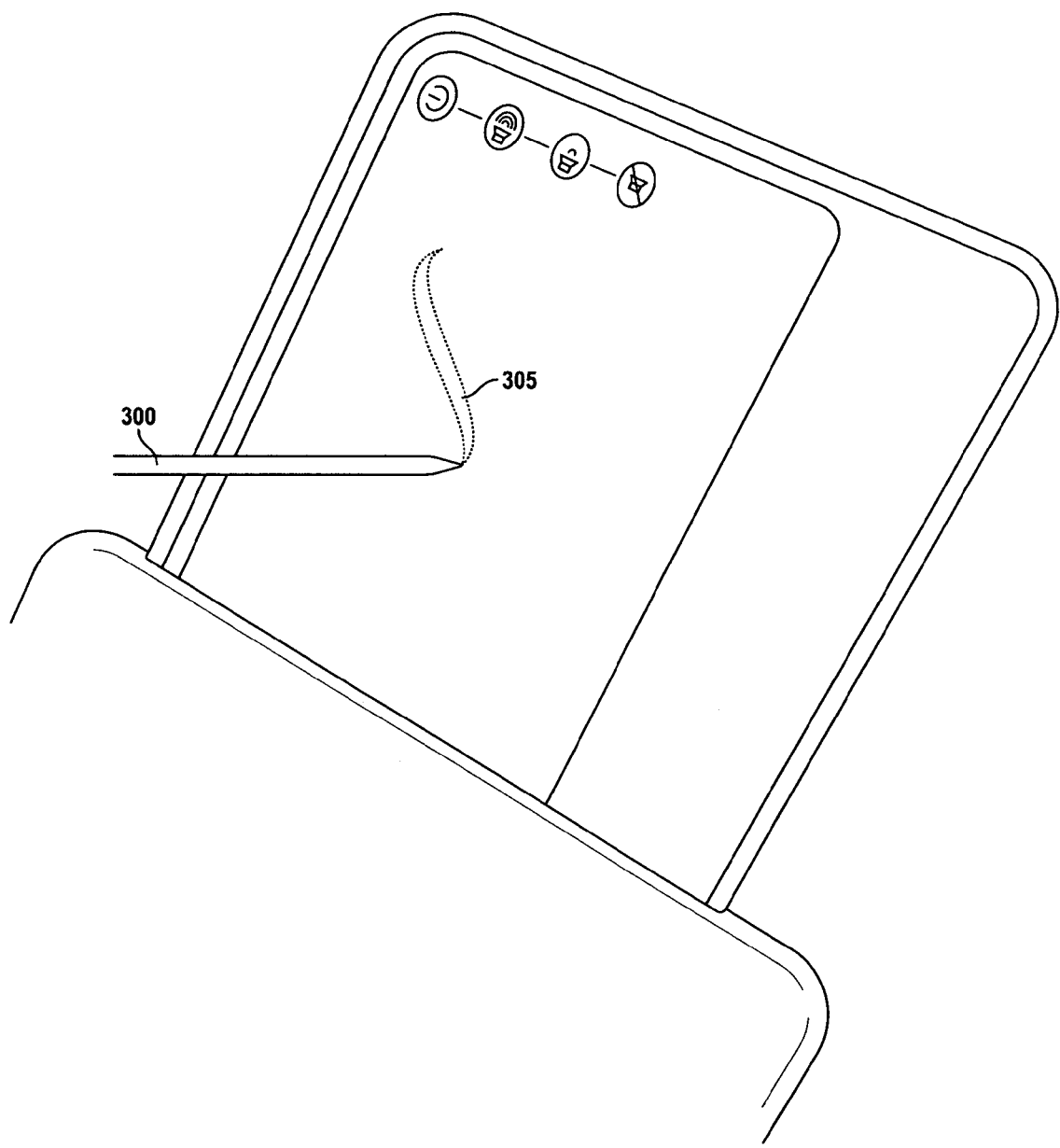
FIG. 3 is a simplified schematic of the lapdesk according to another embodiment of the present invention.

As shown in FIG. 3, touchpad 127 may be configured for use as a drawing pad according to one embodiment of the invention. The touchpad may be configured to detect an object 300 (e.g., a stylus) moving 305 across the surface of the touchpad. The touchpad may be configured to operate in combination with circuit 150 to send control signals to a drawing program operating on the laptop computer. According to one embodiment, the laptop computer's display is configured to display the movement of an object across the touchpad as the user "draws" on the touchpad. The touchpad may be configured to detect different pressure applied to the touchpad. In a drawing mode, the touchpad and circuit 150 may be configured to change the line width of a line being drawn on the laptop computer's display based on the pressure detected by the touchpad. For example, high pressure may be detected for drawing thick lines, whereas lower pressure might be detected for drawing narrow lines.

According to one embodiment of the invention, the touchpad 127 includes a paper detector 180 (see FIG. 1B). The paper detector is configured to detect a piece of paper being placed on the touchpad. The paper detector might include a set of electromagnetic radiation emitters 180*a* and a set of electromagnetic radiation detectors 180*b*. The set of electromagnetic radiation emitters and the set of electromagnetic radiation detectors may be , positioned under the touchpad or adjacent to the touchpad. Each electromagnetic radiation emitter is configured to emit electromagnetic radiation that may be detected by one or more of the electromagnetic radiation detectors as the electromagnetic radiation is reflected by a piece of paper placed on the touchpad. The electromagnetic radiation emitter and electromagnetic radiation detectors may be substantially spread out across the touchpad so the paper detector does not generate a false positive signal that a piece of paper has been placed on the touchpad. For example, the processor may be configured to generate a signal that a piece of paper is placed on the touchpad if four or more, for example, of the electromagnetic radiation detectors detect reflected electromagnetic radiation reflected from a piece of paper. If a piece of paper is detected by the set of electromagnetic radiation detectors, the processor may signal to the laptop computer to start a draw program, or place a blank pallet on the graphical interface of the draw program. A user may then draw on the piece of paper with a pen, a pencil, or the like, and the touchpad is configured to detect the drawing and operate with circuit 150 to send control signals to the laptop computer to display the same drawing on the pallet of the draw program. When the paper is removed from the touchpad, circuit 150 may send a control signal to the laptop computer to save the drawing.

According to another embodiment of the present invention, the touchpad includes a paper clip mechanism (not shown) that is configured to hold the paper on the touchpad. According to this embodiment, the paper detector is configured to detect a piece of paper in the paper clip mechanism. The paper detector may be configured to detect mechanical movement of the paper clip mechanism or may be configured to measure an optical feature of the paper clip mechanism. The mechanical or optical features are modified unambiguously when paper is inserted into the paper clip mechanism. When paper is detected the paper clip mechanism, the draw program may be started, or initialized with a blank pallet.

According to another embodiment of the present invention, the tray includes a pattern of dots (e.g., an Anoto™ pattern) on the top surface of the tray. According to one embodiment, an electronic pen configured to detect the pattern of dots may be used to "write" on the tray and store the writing or drawing performed on the tray based on the pattern of dots. According to one embodiment, the pattern of dots may be on an overlay (e.g., a sheet of plastic or the like) that is configured to be positioned on the tray. According to one embodiment, the pattern of dots is not visible to the human eye, but is detectable by a pen configured to detect the dots. Such an overlay might be used with a scratch-n-scroll feature of the tray to allow for storage of the writing or drawings on the laptop computer.

Figure 4:
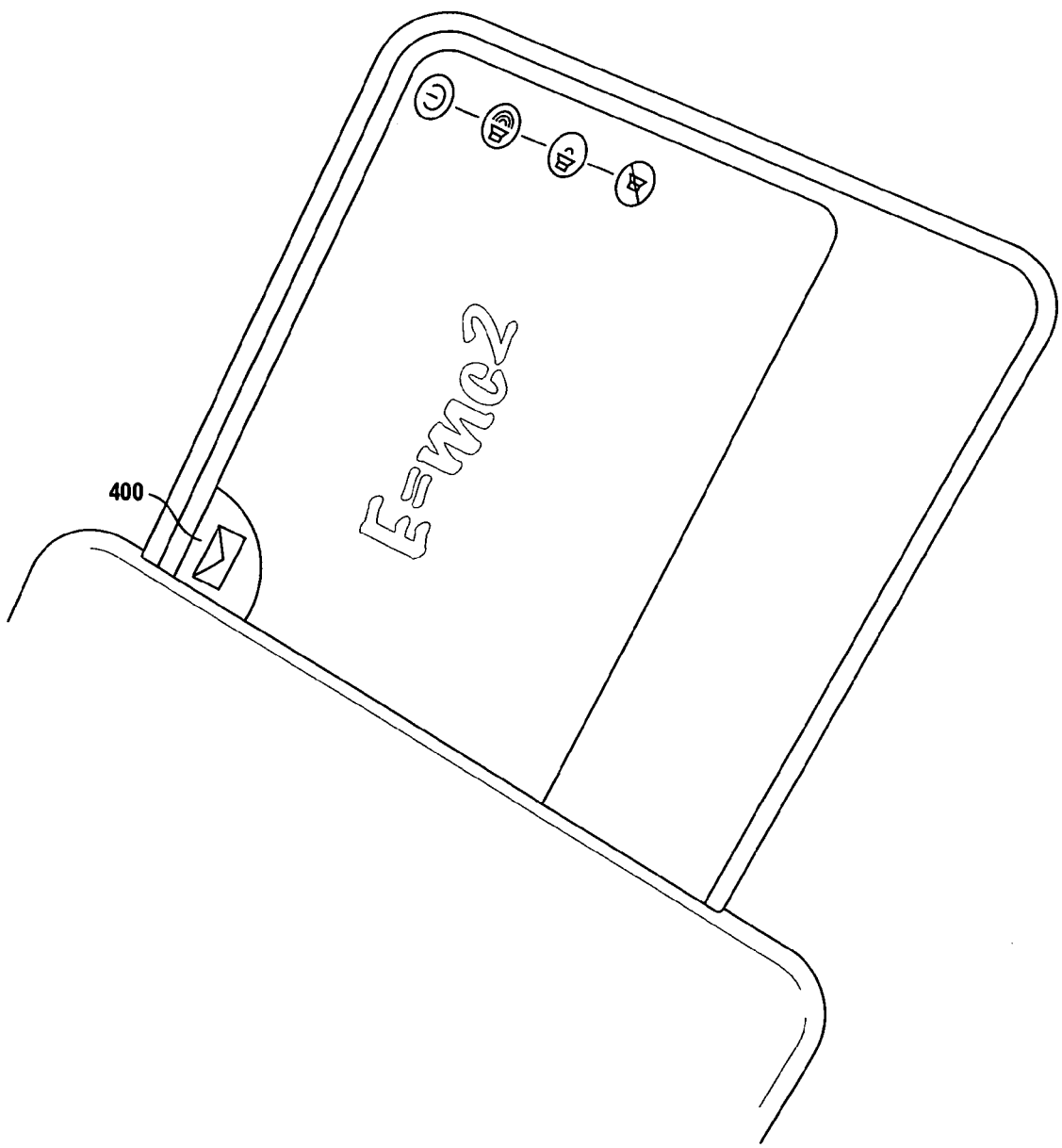
FIG. 4 is a simplified schematic of the lapdesk with an instant messenger button on a touchpad of the lapdesk.

FIG. 4 shows another embodiment of the lapdesk. The lapdesk is configured to operate with a messaging application operating on the laptop computer. The touchpad may be configured to transfer writing (e.g., E-mc2) that has been written touchpad to the laptop computer. The touchpad may include a "send" button 400, which when pressed is configured to direct the laptop computer to send an electronic message, which includes the writing transferred to the laptop computer. The electronic message may be an e-mail message, an SMS message, or the like.

While the invention has been described with respect to specific embodiments, one skilled in the art will recognize that numerous modifications are possible. For example, the touchpad has been described above as a resistive touchpad, however, the touchpad may be a capacitive touchpad, or may include capacitive and resistive detection circuits. Further, while the computer described herein is referred to as a laptop computer, the computer may be a netbook computer, a palm-top computer, or the like. Thus, although the invention has been described with respect to specific embodiments, it will be appreciated that the invention is intended to cover all modifications and equivalents within the scope of the following claims.

What is claimed is:

1. A lapdesk for use with a laptop computer comprising:
a housing having a top configured to support a laptop computer and the housing being configured to block heat emitted from the laptop computer from passing through the housing;
a tray having a touchpad disposed thereon, wherein the tray is configured to slide into the housing and slide out from the housing; and
a circuit coupled to the touchpad, wherein the circuit is configured to transmit control signals from the touchpad to the laptop computer.

2. The lapdesk of claim 1, wherein the touchpad includes a set of control buttons.

3. The lapdesk of claim 2, wherein the set of control buttons includes a power switch configured to change a power state of the laptop computer.

4. The lapdesk of claim 3, wherein the power state is a sleep state, an on state, or a power off state.

5. The lapdesk of claim 2, wherein the set of control buttons includes a set of volume control buttons.

6. The lapdesk of claim 2, wherein the set of control buttons includes a set of media control buttons.

7. The lapdesk of claim 2, wherein the set of control buttons includes a send button configured to initiate the sending of an electronic communication by the laptop computer.

8. The lapdesk of claim 7, wherein the send button is configured to operate with the circuit to send image information for an image drawn on the touchpad in the electronic communication.

9. The lapdesk of claim 8, wherein the electronic communication is an e-mail.

10. The lapdesk of claim 2, wherein the tray includes a set of backlights disposed under the set of control buttons and the set of backlights is configured to backlight the set of control buttons.

11. The lapdesk of claim 2, wherein the set of backlights is configured to be turned on and off by an application running on the laptop computer.

12. The lapdesk of claim 1, wherein the touchpad is a resistive touchpad.

13. The lapdesk of claim 1, wherein the tray is detachable from the housing.

14. The lapdesk of claim 1, wherein the circuit includes a transmitter, which is configured to wirelessly communicate with the laptop computer.

15. The lapdesk of claim 1, wherein the circuit is coupled to a wired connector, which is configured to couple to the laptop computer for transferring control signals between the circuit and the laptop computer.

16. A lapdesk for a laptop computer comprising:
a housing having a top configured to support a laptop computer and the housing being configured to block heat emitted from the laptop computer from passing through the housing;
a tray having a touchpad disposed thereon, wherein the tray is configured to slide into the housing and slide out from the housing;
a circuit coupled to the touchpad, wherein the circuit is configured to transmit control signals from the touchpad to the laptop computer; and
a paper detector coupled to the tray and to the circuit, wherein the paper detector is configured to detect a piece of paper placed on the tray and operate with the circuit to send a control signal to the laptop computer to perform a drawing operation.

17. The lapdesk of claim 16, herein the drawing operation includes starting a draw program on the laptop computer.

18. The lapdesk of claim 16, herein the drawing operation includes launching a blank pallet on a draw program on the laptop computer.

19. The lapdesk of claim 16, the paper detector is configured to detect the removal of a piece of paper from the touchpad and operate with the circuit to send a control signal to the laptop computer to save a drawing drawn on the paper and detected by the touchpad.

* * * * *